(12) United States Patent
Pederson et al.

(10) Patent No.: US 7,468,677 B2
(45) Date of Patent: Dec. 23, 2008

(54) END CAP WARNING SIGNAL ASSEMBLY

(75) Inventors: Gregory A. Pederson, Avon, MN (US); Edward R. Branan, Yulee, FL (US)

(73) Assignee: 911Ep, Inc., Jacksonville, FL (US)

( * ) Notice: Subject to any disclaimer, the term of this patent is extended or adjusted under 35 U.S.C. 154(b) by 292 days.

(21) Appl. No.: 11/543,402

(22) Filed: Oct. 5, 2006

(65) Prior Publication Data

US 2007/0024461 A1     Feb. 1, 2007

Related U.S. Application Data

(63) Continuation-in-part of application No. 10/688,515, filed on Oct. 17, 2003, now abandoned, which is a continuation-in-part of application No. 10/625,387, filed on Jul. 23, 2003, now abandoned, which is a continuation-in-part of application No. 10/017,348, filed on Dec. 14, 2001, now Pat. No. 6,623,151, and a continuation-in-part of application No. 09/627,867, filed on Jul. 28, 2000, now Pat. No. 6,461,008.

(60) Provisional application No. 60/292,470, filed on May 21, 2001, provisional application No. 60/147,240, filed on Aug. 4, 1999.

(51) Int. Cl.
*G09F 9/33* (2006.01)

(52) U.S. Cl. ............... 340/815.45; 340/468; 340/815.4; 362/227; 362/232; 362/543

(58) Field of Classification Search ............ 340/815.45, 340/815.4, 815.49, 815.67, 815.83, 907, 340/468, 463; 362/542, 543, 544, 227, 232, 362/235, 362
See application file for complete search history.

(56) References Cited

U.S. PATENT DOCUMENTS

| 3,389,391 | A | 6/1968 | Keeler, II et al. ............. 343/6.8 |
| 3,914,762 | A | 10/1975 | Klensch ....................... 343/6.5 |
| 4,001,822 | A | 1/1977 | Sterzer ........................ 343/6.5 |
| 4,368,979 | A | 1/1983 | Ruell ........................... 356/71 |

(Continued)

FOREIGN PATENT DOCUMENTS

CA     2164920     6/1996

(Continued)

OTHER PUBLICATIONS

Memorandum Opinion and Order, Case 2:05-cv-00137-TJW, Document 192, Filed Mar. 23, 2007, 23 Pgs. (Markman Ruling).

(Continued)

*Primary Examiner*—Davetta W Goins
(74) *Attorney, Agent, or Firm*—Vidas, Arrett & Steinkraus

(57) ABSTRACT

A light emitting diode (LED) end cap warning signal assembly is disclosed. The end cap warning signal assembly includes a controller for generating a warning signal that simulates a rotating warning light signal. The end cap warning signal assembly further includes an integer number of M-LEDs arranged in an integer number of N-LED groups, with each LED having a duty cycle and at least 6 states. The controller activates each group of LEDs sequentially in an activation sequence

14 Claims, 14 Drawing Sheets

U.S. PATENT DOCUMENTS

| | | | | |
|---|---|---|---|---|
| 4,418,411 | A | 11/1983 | Strietzel | 371/67 |
| 4,525,306 | A | 6/1985 | Yajima | 260/428.5 |
| 4,620,268 | A | 10/1986 | Ferenc | 362/74 |
| 4,920,340 | A | 4/1990 | Mizuno | 340/905 |
| 5,027,260 | A | 6/1991 | Lyons et al. | 362/74 |
| 5,057,828 | A | 10/1991 | Rousseau | 340/764 |
| 5,164,992 | A | 11/1992 | Turk et al. | 382/2 |
| 5,182,647 | A | 1/1993 | Chang | 358/213.11 |
| 5,198,746 | A | 3/1993 | Gyugyi et al. | 323/207 |
| 5,204,675 | A | 4/1993 | Sekine | 340/933 |
| 5,381,155 | A | 1/1995 | Gerber | 342/104 |
| 5,519,596 | A | 5/1996 | Woolverton | 362/250 |
| 5,557,257 | A | 9/1996 | Gieffers | 340/474 |
| 5,568,406 | A | 10/1996 | Gerber | 364/562 |
| 5,608,391 | A | 3/1997 | Bantli et al. | 340/933 |
| 5,644,291 | A * | 7/1997 | Jozwik | 340/472 |
| 5,657,008 | A | 8/1997 | Bantli | 340/933 |
| 5,661,473 | A | 8/1997 | Paschal | 340/933 |
| 5,668,880 | A | 9/1997 | Alajajian | 380/49 |
| 5,710,833 | A | 1/1998 | Moghaddam et al. | 382/228 |
| 5,717,390 | A | 2/1998 | Hasselbring | 340/933 |
| 5,734,337 | A | 3/1998 | Kupersmit | 340/397 |
| 5,809,161 | A | 9/1998 | Auty et al. | 382/104 |
| 5,809,681 | A | 9/1998 | Miyamoto et al. | 40/582 |
| 5,828,055 | A | 10/1998 | Jebens | 250/214 |
| 5,864,306 | A | 1/1999 | Dwyer et al. | 340/928 |
| 5,875,261 | A | 2/1999 | Fitzpatrick et al. | 382/165 |
| 5,946,417 | A | 8/1999 | Bonneau et al. | 382/236 |
| 5,948,038 | A | 9/1999 | Daly et al. | 701/117 |
| 6,035,053 | A | 3/2000 | Yoshioka et al. | 382/104 |
| 6,035,055 | A | 3/2000 | Wang et al. | 382/118 |
| 6,035,074 | A | 3/2000 | Fujimoto et al. | 382/282 |
| 6,052,068 | A | 4/2000 | Price R-W et al. | 340/933 |
| 6,054,932 | A | 4/2000 | Gartner et al. | 340/815.65 |
| 6,072,893 | A | 6/2000 | Luo et al. | 382/117 |
| 6,076,064 | A | 6/2000 | Rose, Jr. | 705/1 |
| 6,081,206 | A | 6/2000 | Kielland | 340/937 |
| 6,087,932 | A * | 7/2000 | Belgard | 340/468 |
| 6,100,791 | A * | 8/2000 | Bader et al. | 340/331 |
| 6,111,671 | A | 8/2000 | Bahuguna et al. | 359/30 |
| 6,121,898 | A | 9/2000 | Moetteli | 340/933 |
| 6,181,805 | B1 | 1/2001 | Kolke et al. | 382/118 |
| 6,384,742 | B1 | 5/2002 | Harrison | 340/944 |
| 6,389,155 | B2 | 5/2002 | Funayama et al. | 382/118 |
| 6,396,954 | B1 | 5/2002 | Kondo | 382/224 |
| 6,400,828 | B2 | 6/2002 | Covell et al. | 382/100 |
| 6,424,269 | B1 | 7/2002 | Pederson | 340/815.45 |
| 6,483,439 | B1 | 11/2002 | Vukosic | 340/815.65 |
| 6,700,502 | B1 | 3/2004 | Pederson | 340/815 |
| 6,789,930 | B2 | 9/2004 | Pederson | 362/545 |
| 6,879,263 | B2 | 4/2005 | Pederson et al. | 340/815.45 |
| 6,930,615 | B2 | 8/2005 | Pederson | 340/815.45 |
| 6,989,743 | B2 | 1/2006 | Pederson | 340/515.45 |
| 6,995,681 | B2 | 2/2006 | Pederson | 340/815.45 |
| 7,033,036 | B2 | 4/2006 | Pederson | 362/35 |
| 7,038,593 | B2 | 5/2006 | Pederson | 340/815.45 |
| 7,064,674 | B2 | 6/2006 | Pederson | 340/815.45 |
| 7,080,930 | B2 | 7/2006 | Pederson | 362/545 |
| 7,095,334 | B2 | 8/2006 | Pederson | 340/815.45 |
| 7,153,013 | B2 | 12/2006 | Pederson | 362/543 |
| 7,352,339 | B2 * | 4/2008 | Morgan et al. | 345/31 |

FOREIGN PATENT DOCUMENTS

| | | |
|---|---|---|
| DE | 19721673 | 11/1997 |
| DE | 29712281 | 1/1998 |
| EP | 0967590 A1 | 12/1999 |
| GB | 2139340 | 11/1984 |
| JP | 60093542 | 5/1985 |
| JP | 63174107 | 11/1988 |
| WO | WO99/42985 | 8/1999 |

OTHER PUBLICATIONS

Installation Guide for 94048/94042/94068/94062—Series Edge Lightbar, Whelen Engineering Company © 1997. Whelen Doc. Nos. 100556-100560.

Target Tech Product Brochure for: Q-Stik/Traffic Controller, © 1997. Doc. Nos. FS1000221-FS1000223.

Target Tech Product Schematic for Arrowbar Extrusion, dated Jun. 20, 1997. Doc. No. FS086916.

EDN Magazine, vol. 210, Article entitled "Tech Toys, Who says engineers can't have fun?" by Joan Lynch, dated Sep. 2, 1999.

Whelen Engineering Company, Inc., product brochure for The Messenger Control Head Installation for Models MGC01/MGC02, © 1998. Whelen Doc. Nos. 00022-00023.

Whelen Engineering New Product Preliminary Bulletin for Smart Arrow Messenger™ advanced traffic control for edge® and edge+ plus® series lightbars, © 1997. Whelen Doc. Nos. 00025-00028.

Whelen Engineering Automotive: Serial Communication, MPC01 Configuration Software Users Guide, © 1997. Whelen Doc. Nos. 00116-00139.

Target Tech A Unit of Federal Signal Corporation, product literature brochure entitled: "Your best source for vehicular warning equipment Warranty" © 1997. Doc. Nos. FS0086973.

Whelen Engineering Company Product Book GALL'S LB 393 Whelen Messenger, dated Sep. 15, 1997. Whelen Doc. Nos. 100547-100555.

Article Entitled "The Application of Light Emitting Diodes to Traffic Signals" by I. Lewin, J. Corgin, and M. Janoff; presented at the 1995 IESNA Annual Conference; published in the *Journal of the Illuminating Engineering Society* Winter 1997.

Ambulance Emergency Warning Light System—Second Draft of Performance Specification, AMD Standard 001-025. (Section 016 Cited in Lewin Expert Report Apr. 30, 2007 as Exhibit F.) (Also cited in Federal Signal MX 7000 Invalidity Chart).

Federal Signal Premium Vision Light Bar, Exhibit AF of Ian Lewin Expert Report of Apr. 30, 2007. FS0096623-0096654.

"The Application of Light Emitting Diodes to Traffic Signals"; Published in *Illuminating Engineering Society of North America*, 8th Edition. Cited in Expert Report of Ian Lewin Apr. 30, 2007. First presented to the Society at the 1995 Annual Technical Conference.

Target Tech, Unit of Federal Signal Corp. Bates Nos. FS1000221 through FS1000238. Cited in Expert Report of Ian Lewin Apr. 30, 2007.

Federal Signal Light Stik data sheet, Bates Nos. FS1000210 through FS 1000212. Cited in Expert Report of Ian Lewin Apr. 30, 2007.

Federal Signal data sheets for Signal Master and Qstick, copyright 1997. Cited in Expert Report of Ian Lewin Apr. 30, 2007. LEWIN000269-000272.

Tomar Models 925-N6D Neobar lightbar 925M-N6D and Mini Neobar lightbar Installation, Operation and Maintenance Instructions, dated Apr. 26, 1993; produced Mar. 16, 2007 in Patent Rule 3-6 Invalidity Contentions of Defendant Tomar Electronics, Inc., dated May 14, 2007. Bates Nos. 320-324.

Tomar List Price Effective Oct. 1, 1997. produced Mar. 16, 2007 in Patent Rule 3-6 Invalidity Contentions of Defendant Tomar Electronics, Inc., dated May 14, 2007. Bates Nos. 344-351.

Tomar Distributor Price List, Effective Feb. 1, 1996; produced Mar. 16, 2007 in Patent Rule 3-6 Invalidity Contentions of Defendant Tomar Electronics, Inc., dated May 14, 2007. Bates Nos. 352-357.

Tomar 925 Strobebar brochure; produced Mar. 16, 2007 in Patent Rule 3-6 Invalidity Contentions of Defendant Tomar Electronics, Inc., dated May 14, 2007. Bates Nos. 0365-0368.

Tomar 1992 Neobe brochure; produced Mar. 16, 2007 in Patent Rule 3-6 Invalidity Contentions of Defendant Tomar Electronics, Inc., dated May 14, 2007. Bates Nos. 0370-0377.

Tomar Feb. 1996 Neobe Brochure; produced Mar. 16, 2007 in Patent Rule 3-6 Invalidity Contentions of Defendant Tomar Electronics, Inc., dated May 14, 2007. Bates No. 0378-0385.

Whelen publication number EDGE Series Light Bars New Edge Eclispse, Copyright 1997; Cited in Expert Report of Scott Sikora as Exhibit 12, dated Apr. 30, 2007. Bates Nos. 00042-00051.

SAE J2498: Minimum Performance of the Warning Light System on Emergency Vehicles (1999); (Cited in Federal Signal MX 7000 Invalidity Chart).

SAE J 595 (1990); (Cited in Federal Signal '084 Invalidity Chart).

IESNA Progress Report, Nov. 1995. Bates No. Lewin000040. (Cited in Expert Report of Ian Lewin Apr. 30, 2007.).

Whelen Blink Materials Documents Numbered 000140-000251 (Cited in Whelens Amended Invalidity Contentions, May 14, 2007).

Tomar Distributor Price List, Effective Nov. 1, 1993; produced Mar. 16, 2007 in Patent Rule 3-6 Invalidity Contentions of Defendant Tomar Electronics, Inc., dated May 14, 2007. Bates Nos. 0358-0361.

Whelan publication number, "EDGE0497, copyright 1997"; Cited in expert report of Scott Sikora as Exhibit 12, dated Apr. 30, 2007.

* cited by examiner

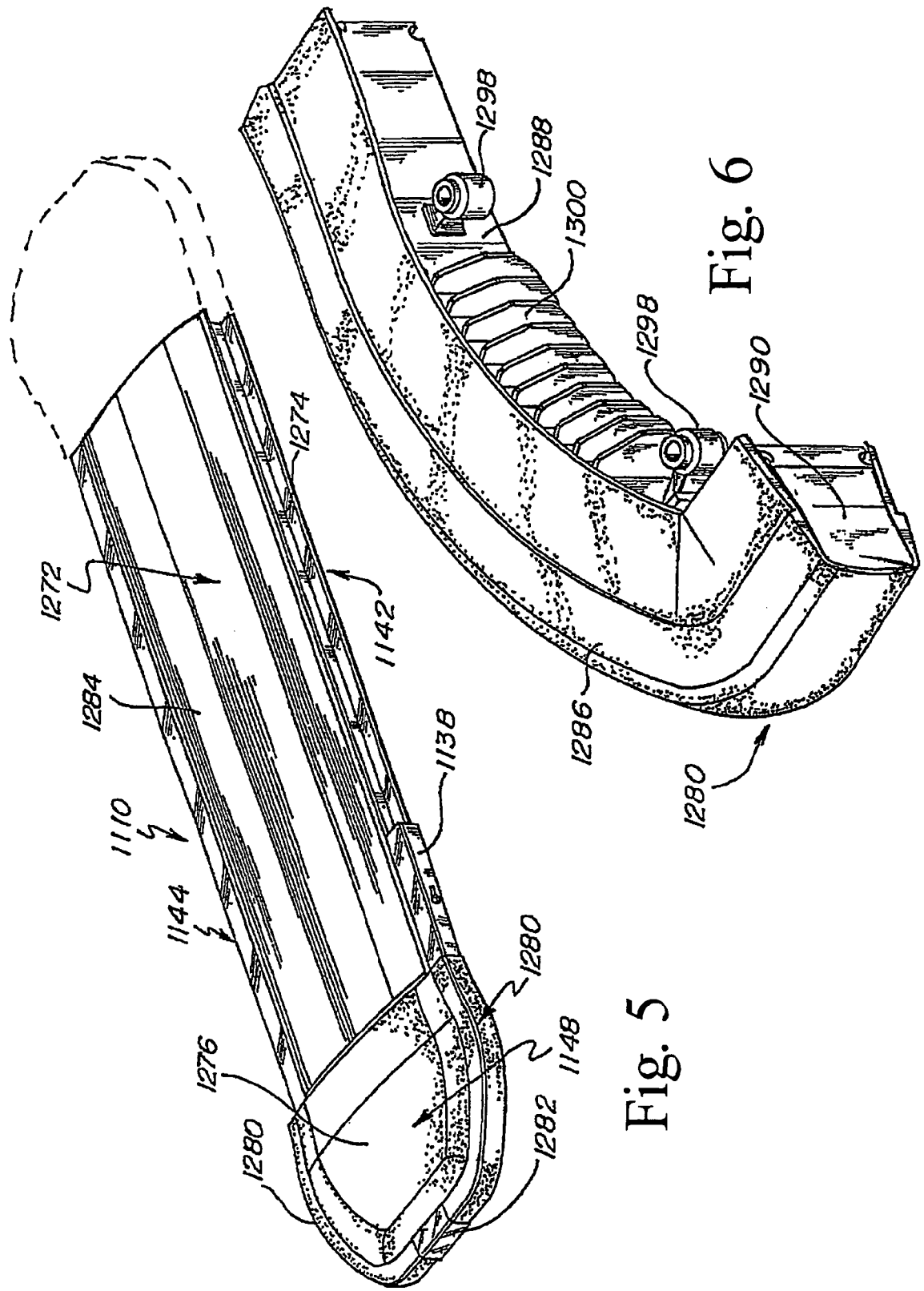

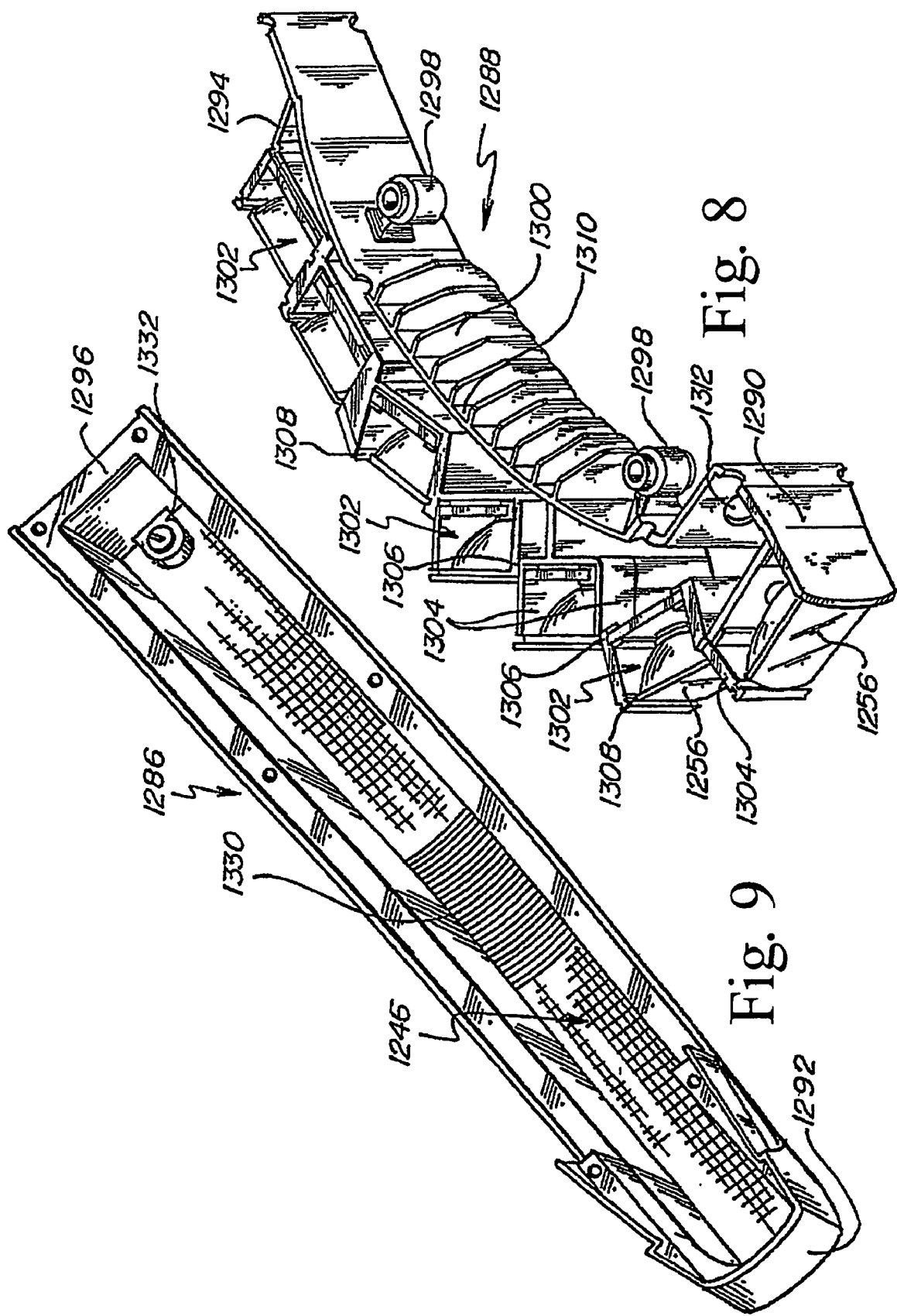

END CAP WARNING SIGNAL ASSEMBLY

The present invention is a Continuation-In-Part Application of, and claims priority to, U.S. patent application Ser. No. 10/688,515 filed Oct. 17, 2003, which is a Continuation-In-Part of, and claims priority to, U.S. patent application Ser. No. 10/625,387 filed Jul. 23, 2003, which is a Continuation-In-Part Application of, and claims priority to, U.S. patent application Ser. No. 10/017,348 filed Dec. 14, 2001, now issued U.S. Pat. No. 6,623,151 issued Sep. 23, 2003, which is a utility patent application claiming priority to U.S. Provisional Patent Application Ser. No. 60/292,470 filed May 21, 2001, and which is a Continuation-In-Part of U.S. utility application Serial No. 09/627,867 filed Jul. 28, 2000, now issued U.S. Pat. No. 6,461,008 issued Oct. 8, 2002, which claimed priority to U.S. provisional application Ser. No. 60/147,240 filed Aug. 4, 1999, all of which are incorporated herein by reference in their entireties.

BACKGROUND OF THE INVENTION

Emergency lights of the type used on emergency vehicles such as fire trucks, police cars, motorcycles, snow plows, highway maintenance vehicles, dump trucks and/or ambulances, utilize warning signal lights to produce a variety of light signals. These light signals may involve the use of various colors and patterns. Generally, these warning signal lights in the past have been formed of incandescent and halogen light sources having reflective back support members and colored filters.

Many problems exist with the known methods for producing warning light signals. One particular problem with known light sources is their reliance on mechanical components to revolve or oscillate the lamps to produce the desired light signal or lighting effect. Additionally, these components increase the size of the light support which may adversely affect the vehicles aerodynamic characteristics. Moreover, because of the relatively poor reliability of conventional lighting, and the complexity of the present strobe rotational systems, there is an increased likelihood that a breakdown of the light source will occur, requiring the repair or replacement of the defective component. Finally, conventional light sources require a relatively large amount of electrical current during operation. The demands upon the electrical power system for a vehicle may therefore exceed available electrical resources, reducing optimization of performance or worse, generating a potential hazard from shorted or over heated systems.

Halogen lamps or gaseous discharge xenon lamps generally emanate large amounts of heat which is difficult to dissipate from a sealed light enclosure or emergency light and which may damage the electronic circuitry contained therein. In addition, these lamps consume large amounts of current requiring a large power supply, battery, or electrical source which may be especially problematic for use with a vehicle. These lamps also generate substantial electromagnetic emissions which may interfere with radio communications for a vehicle. Finally, these lamps, which are not rugged, have relatively short life cycles necessitating frequent replacement.

Another problem with the known warning signal lights is the use of filters to produce a desired color. Filtering techniques produce more heat that must be dissipated. Moreover, changing the color of a light source requires the physical removal of the filter from the light source or emergency light and the replacement with a new filter. Furthermore, filters fade or flake over time rendering the filters unable to consistently produce a desired color for observation in an emergency situation.

These problems associated with traditional signaling lamps are exacerbated by the fact that creating multiple light signals requires multiple signaling lamps. Further, there is little flexibility in modifying the light signal created by a lamp. For example, changing a stationary lamp into one that rotates or oscillates would require a substantial modification to the light support which may not be physically or economically possible.

The present invention generally relates to electrical lamps and to high brightness light-emitting diode or "LED" technology which operates to replace gaseous discharge or incandescent lamps as used with vehicle warning signal light sources.

Another problem with the known warning signal lights is the use of rotational and/or oscillating mechanisms which impart rotational or oscillating movement to a light source for observation during emergency situations. These mechanical devices are frequently cumbersome and difficult to incorporate and couple onto various locations about a vehicle due to the size of the device. These mechanical devices also frequently require a relatively large power source to impart rotational and/or oscillating movement for a light source.

Another problem with the known warning signal lights is the absence of flexibility for the provision of variable or modulated illumination intensity for the light sources to increase the number of available distinct and independent visual light effects. In certain situations it may be desirable to provide variable or modulated illumination intensity for a light signal, for the creation of a unique light effect to facilitate observation by an individual. In addition, the provision of a variable or modulated light intensity for a light signal may further enhance the provision of a unique desired light effect for observation by an individual.

Current end cap warning signal assemblies are generally limited to light signals produced by rotational and/or oscillating mechanisms which impart rotational or oscillating movement to a light source for observation during emergency situations.

In view of the above, there is a need for an end cap warning signal assembly that:

(1) Is capable of producing the appearance of a rotating warning light signal without reliance upon mechanical components;

(3) Generates little heat;

(4) Uses substantially less electrical current;

(5) Produces significantly reduced amounts of electromagnetic emissions;

(6) Is rugged and has a long life cycle;

(7) Produces a truer light output color without the use of filters;

(8) Provides variable or modulated light intensity to the light source.

The ease of visualization of an emergency vehicle is a primary concern to emergency personnel regardless of the location of the observer. In the past, optimal observation of emergency lights has occurred when an individual was either directly in front of, or behind, an emergency vehicle. Observation from the sides, or at an acute angle relative to the sides, frequently resulted in reduced observation of emergency lights during an emergency situation. A need therefore exists to improve the observation of emergency lights for a vehicle regardless of the location of the observer. A need also exists to improve the flexibility of placement of emergency lights upon a vehicle for observation by individuals during emergency situations.

A need exists to reduce the size of light supports on an emergency vehicle and to improve the efficiency of the light sources particularly with respect to current draw and reduced aerodynamic drag. In addition, the flexibility for the positioning of the light sources about a vehicle for observation by individuals is required to be enhanced in order to optimize utility for a warning signal light. In order to satisfy these and other needs, more spatially efficient light sources such as LEDs are required.

GENERAL DESCRIPTION OF THE INVENTION

According to the invention, there is provided a light emitting diode (LED) end cap warning signal assembly. In general, the end cap warning signal assembly may be formed from an array of LEDs, arranged around the interior periphery of the end cap housing, operatively connected with a controller, and in electric communication with a power supply, battery, or other electrical source. The end cap housing itself may be formed from engaging upper and lower housing pieces together. Each housing piece may have curvilinear portions, straight portions, or a combination of curvilinear and straight portions. The LEDs are mounted along the internal periphery of either the upper or lower housing pieces such that, when the upper housing piece is engaged to the lower housing piece, the LEDs are contained within the upper and lower housing piece combination. The upper housing and lower housing may be designed to engage such that the LEDs are visible after engagement. It may also be desirable to include a clear protective barrier at the periphery of the upper and lower housing engagement region in order to prevent damage to the LEDs.

Rotating and oscillating light signals may be produced by sequentially illuminating LED groups or individual LEDs. The warning light signals produced by the LEDs may provide various light signals, colored light signals, or combinations or patterns of light signals for use in association with a vehicle or by an individual. These light signals may include a revolving light, a strobe light, or a flashing light at various rates or intervals of illumination, modulated or variable intensity light, an oscillating light, an alternating light, a pulsating light signal, and/or any combination thereof. The light signals identified herein are in no way exhaustive of the almost infinite different light signals available for incorporation into a lighting system.

The end cap warning signal assembly may be electrically coupled to a controller used to regulate, modulate, or pulse, the light intensity for the light sources to provide for various patterns or combinations of patterns of illumination to create an illusion of rotation or other type of illusion for the warning signal light without the use of mechanical devices.

The controller is in electrical communication with the power supply and operatively connected with the LEDs to modulate the LED light intensity for provision of a desired type of warning light effect. A plurality of LEDs may be electrically coupled in either a parallel or series manner to the controller. In addition, the end cap assembly may be encased within a waterproof enclosure to prevent moisture or other contamination of the LEDs.

The individual LEDs and/or arrays of LEDs may be used as emergency light signals which include, but are not limited to, front and rear traffic warning lights and/or alley lights employed by law enforcement vehicles to illuminate dark areas relative to the emergency vehicle. An intersection clearing light may be a particular application of rotating/oscillating appearance of the warning signal produced by the LEDs. The intersection clearing light mode preferably warns all traffic perpendicular to the direction of travel of the emergency vehicle as to the presence of an emergency vehicle within an intersection, an ideal application of the end cap warning signal assembly.

A principal advantage of the present invention is to provide an end cap warning signal assembly capable of simulating revolving or oscillating light signals without the use of mechanical components.

Another principal advantage of the present invention is that the end cap warning signal assembly is capable of producing several different light signals or combinations or patterns of light signals.

Still another principal advantage of the present invention is to be rugged and to have a relatively longer life cycle than traditional end cap warning signal assemblies.

Still another principal advantage of the present invention is to produce a truer or pure light output color without the use of filters.

Still another principal advantage of the present invention is to allow the user to adjust the color of the light signal without having to make a physical adjustment to the light source from a multi-colored panel.

Still another principal advantage of the present invention is the provision of an LED end cap warning signal assembly which is formed of a relatively simple and inexpensive design, construction, and operation and which fulfills the intended purpose without fear of failure, or risk of injury to persons and/or damage to property.

Still another principal advantage of the present invention is the provision of an LED end cap warning signal assembly which may illuminate bright bursts of intense white or colored light to enhance the visibility and safety of a vehicle in an emergency or other signaling situation.

Still another principal advantage of the present invention is the provision of an LED end cap warning signal assembly which produces brilliant lighting in any of the colors associated with an emergency vehicle light signal such as red, blue, amber, green, and/or white, or combinations thereof.

Still another principal advantage of the present invention is the provision of an LED end cap warning signal assembly which is highly resistant to corrosive effects and which is impervious to moisture build-up.

Still another principal advantage of the present invention is the provision of an end cap warning signal assembly which includes LED technology and which is operated by a controller to provide any desired light signal or colored light signal including but not limited to rotational, pulsating, oscillating, strobe, flashing, encoded, alternating, variable, and/or modulated light signals without the necessity for mechanical devices.

Still another principal advantage of the present invention is the provision of a warning signal light bar which is capable of simultaneously producing several different light signals, in addition to the warning signals produced by the end cap warning signal assembly.

Still another advantage of the present invention is the provision of a controller, which includes a microprocessor, which is in electrical communication with the LEDs of the end cap warning signal assembly to selectively activate individual LEDs or groups of LEDs to produce a rotating, oscillating, flashing, strobe, alternating, variable, encoded, modulated and/or pulsating warning light signals or combination warning light signals.

Still another advantage of the present invention is the provision of an end cap warning signal assembly having a controller in electrical communication with each individual LED or group of LEDs for the provision of a variable or modulated light intensity to the LEDs to provide various desired patterns or combinations of patterns of illumination.

BRIEF DESCRIPTION OF THE DRAWINGS

FIG. 5 is a partial isometric view of an embodiment for an end cap warning signal assembly, with a warning signal light bar;

FIG. 6 is a detail isometric view of an embodiment of a quadrant end cap warning signal assembly;

FIG. 8 is a detail isometric view of a heat sink frame for a quadrant end cap warning signal assembly;

FIG. 9 is a detail internal view of a lens for a quadrant end cap warning signal assembly;

DETAILED DESCRIPTION OF THE PREFERRED EMBODIMENTS

Figure 1:
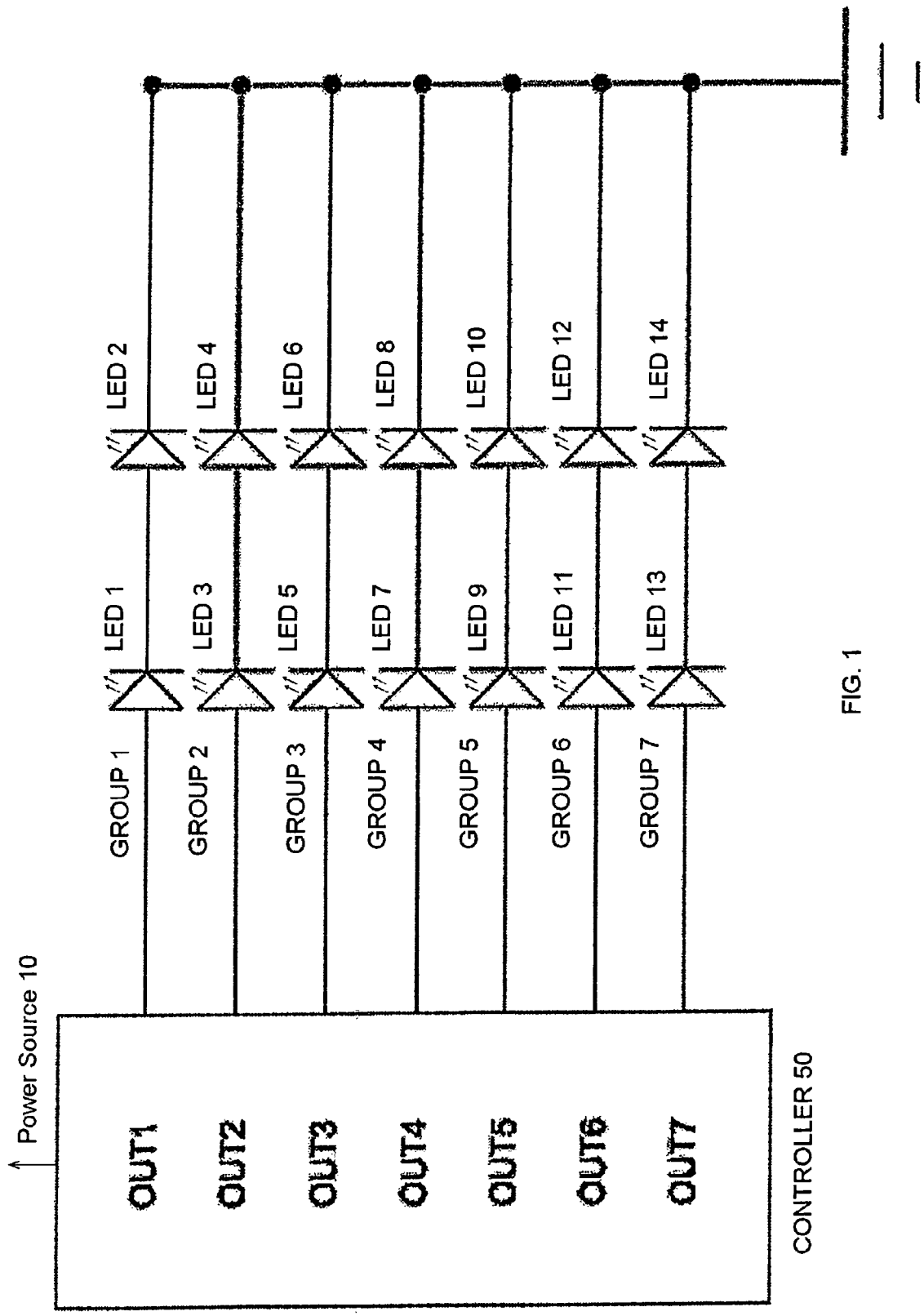
FIG. 1 is an electrical schematic of an embodiment of the present invention, depicting 7 groups of LEDs, each group comprising 2 LEDs.

FIG. 1 shows an embodiment of generic controller 50 in electric communication with LEDs 1-14. Although not depicted in FIG. 1, controller 50 generally may comprise a microprocessor as well as additional electronics components, such as transistors, resistors, diodes, oscillators, capacitors, and voltage regulators that one skilled in art would recognize how to connect in order to control the LEDs 1234.

Controller 50 may include a memory device that stores any firmware code used to illuminate the LEDs 1234. The memory element may be a separate electronic component, such as an EEPROM, FlashRAM, or any other memory devices known by those skilled in the art. The memory element may alternatively be a part of the microcontroller itself, thereby reducing the overall footprint of the controller 50 by reducing the number of individual components.

As seen in FIG. 1, controller 50 is used to activate groups of LEDs 1234 that are electrically connected in series, the controller 50 being powered by power source 10. For example, FIG. 1 shows that output 1 of controller 50 (OUT1) is electrically connected to LED 1, which is electrically connected in series to LED 2, thereby forming a group of LEDs, namely Group 1. When sufficient voltage is applied to the anode of LED 1, both LED 1 and LED 2 begin to conduct, thereby illuminating both LED 1 and LED 2. Likewise, output 2 (OUT2) of controller 50 is electrically connected to LED Group 2 comprising LED 3 and LED 4.

Figure 2:
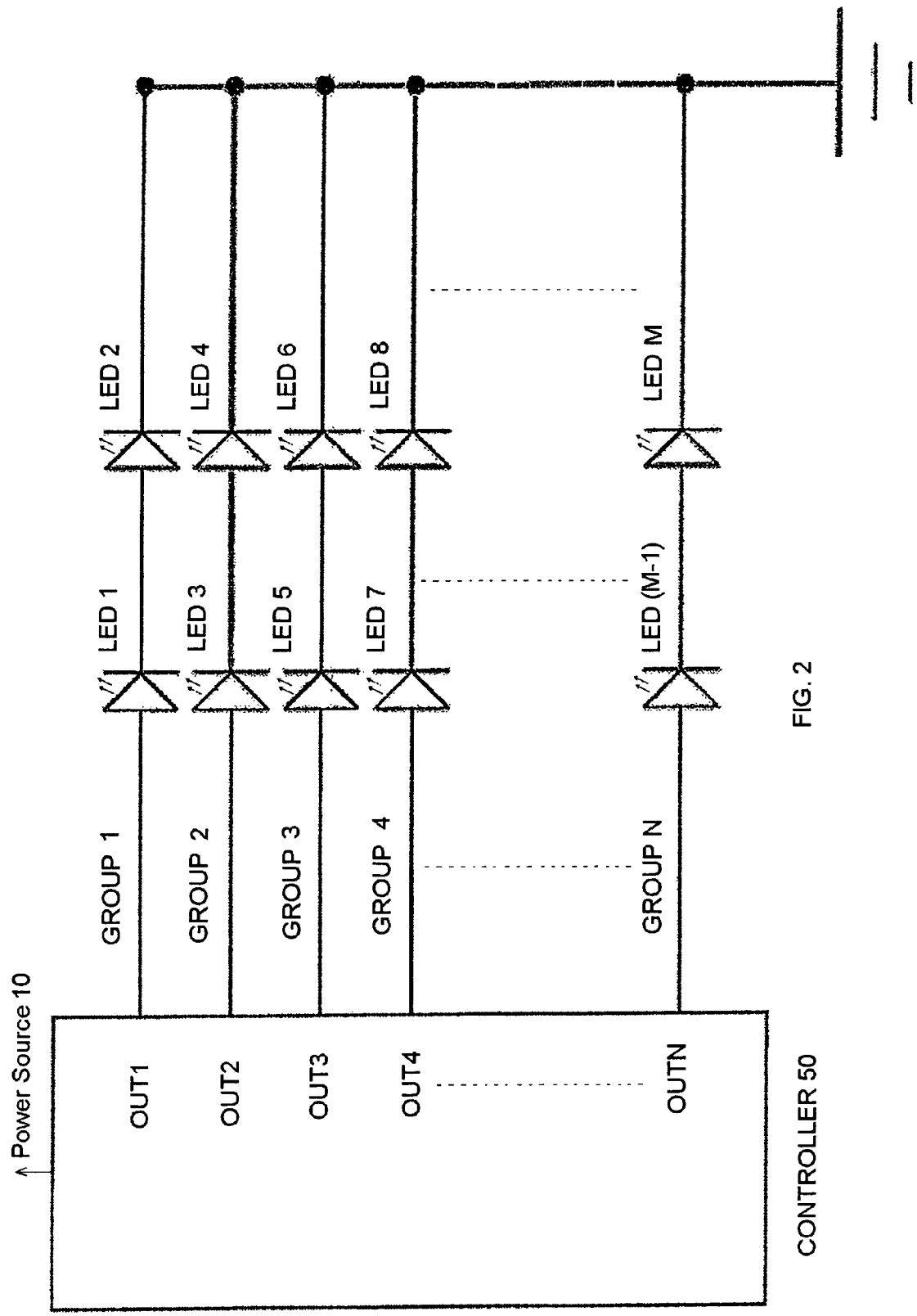
FIG. 2 is a generalized embodiment of the electrical schematic of FIG. 1, depicting a number M of LEDs, arranged in a number N groups of LEDs, each group comprising 2 LEDs.

The controller 50 of FIG. 1 shows only seven outputs and fourteen LEDs, and therefore seven groups of two LEDs 1234. In alternative embodiments a much larger number of LEDs 1234 may be controlled. As depicted generally in FIG. 2, a power source 10 and a controller 50 with a number of N outputs (with N being an integer of one or more) may control a number of M LEDs (with M being an integer of one or more). The M LEDs in FIG. 2 are shown arranged in N groups of two LEDs. Controller 50 may be designed to provide independent control of or between the N groups of LEDs.

Figure 3:
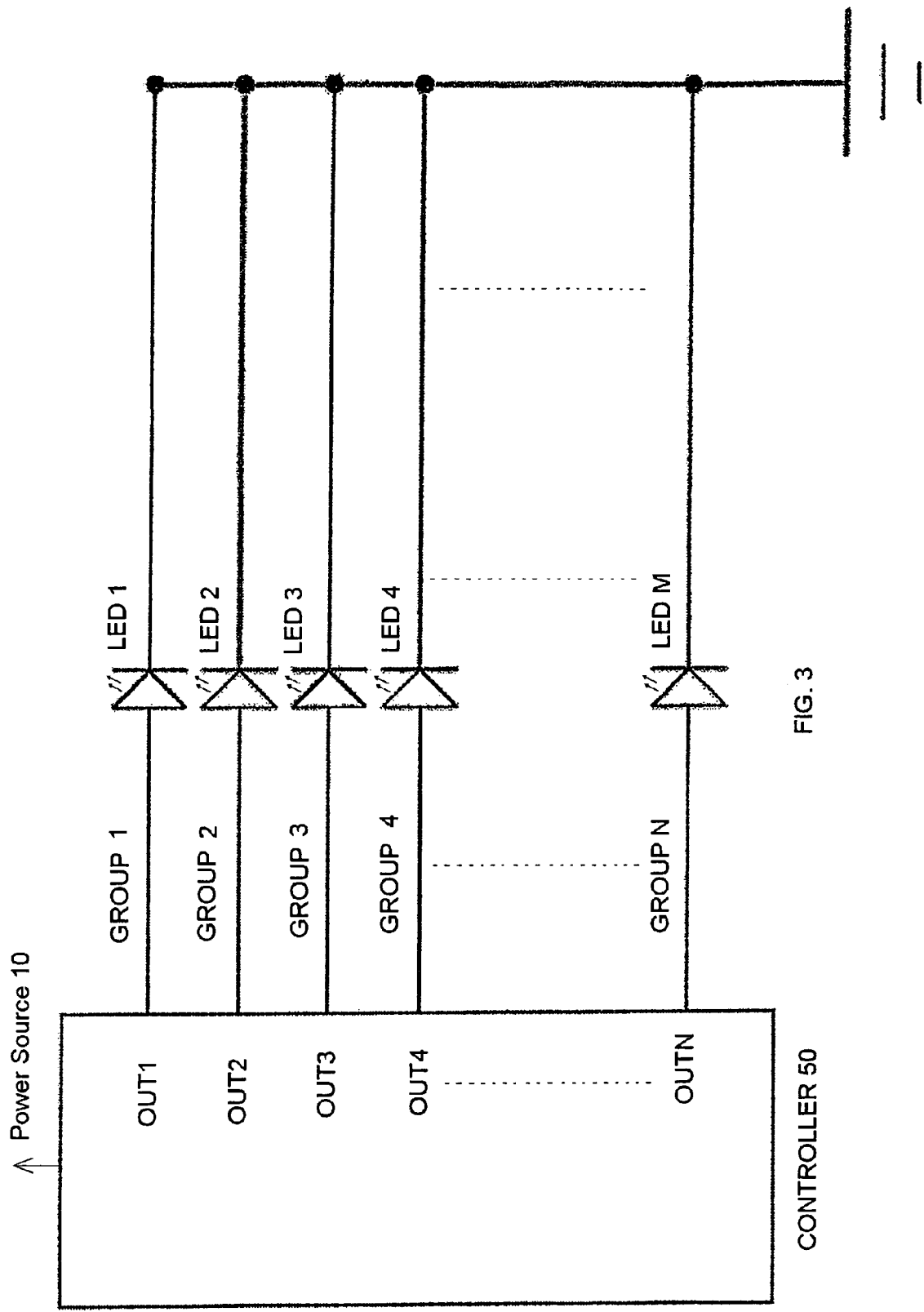
FIG. 3 is a generalized embodiment of the electrical schematic of FIG. 1, depicting a number M of LEDs, arranged in a number N groups of LEDs, each group comprising 1 LED.

Furthermore, it should also be obvious that given a sufficient power supply and voltage at each output N, any number M of LEDs 1234 may be electrically connected in a group N. In other words, a single output from controller 50 may control numerous LEDs, rather than just two LEDs. It should also be noted that it may be desirable to connect each output of controller 50 to a single LED 1234. In other words, each LED group N may contain only a single LED, as shown in FIG. 3.

As mentioned above, a plurality of LEDs 1234 in a quadrant end cap assemblies 1280 may be electrically connected in a parallel manner, a series manner, or a combination of series and parallel, to the controller 50. For example, a first group of two or three LEDs, electrically connected in series, and a second group of two or three LEDs, electrically connected in series, can be electrically connected in parallel to the controller 50. Then, a third group of two or three LEDs, electrically connected in series, and a fourth group of two or three LEDs, electrically connected in series, can be electrically connected in parallel to the controller 50. This pattern or variations of this pattern could be continued to create a quadrant end cap assemblies 1280. As described in more detail below, two quadrant end cap assemblies 1280, shown in FIG. 6, are engaged to the exterior perimeter of the upper and lower end cap housings 1276 and 1278 respectively, shown in FIG. 7. In a preferred embodiment, a first quadrant end cap assemblies 1280 can be daisy chained to a second quadrant end cap assemblies 1280, thereby allowing a single controller 50 to control both the first and second quadrant end cap assemblies 1280. The daisy chaining of the two quadrant end cap assemblies 1280 thereby simplifies the design of the circuitry and allows for a more realistic appearance of a rotational light signal by increasing the overall number of groups of LEDs involved in the sequencing.

The controller 50 of FIG. 1 may produce a plurality of distinct warning light signals. Most desirably, the controller 50 may produce a warning light signal which gives the illusion of a rotating or an oscillating light signal. However, further distinct warning light signals may include, but are not necessarily limited to, a strobe light signal, a pulsating light signal, an alternating light, a modulated light signal, a variable light signal, a flashing light signal, and/or combinations or patterns of the above. It should be noted that the light signals identified herein are not exhaustive of the almost infinite variety of different light signals available for use in an emergency warning application.

In one embodiment, a rotating or oscillating light signal may be established by the sequential illumination of groups of LEDs 1234, or individual LEDs 1234. Each LED has a duty cycle, the duty cycle being the ratio of "on" time to "off" time of the LEDs. Groups of LEDs are arranged about the periphery of the end cap housing.

Figure 4A:
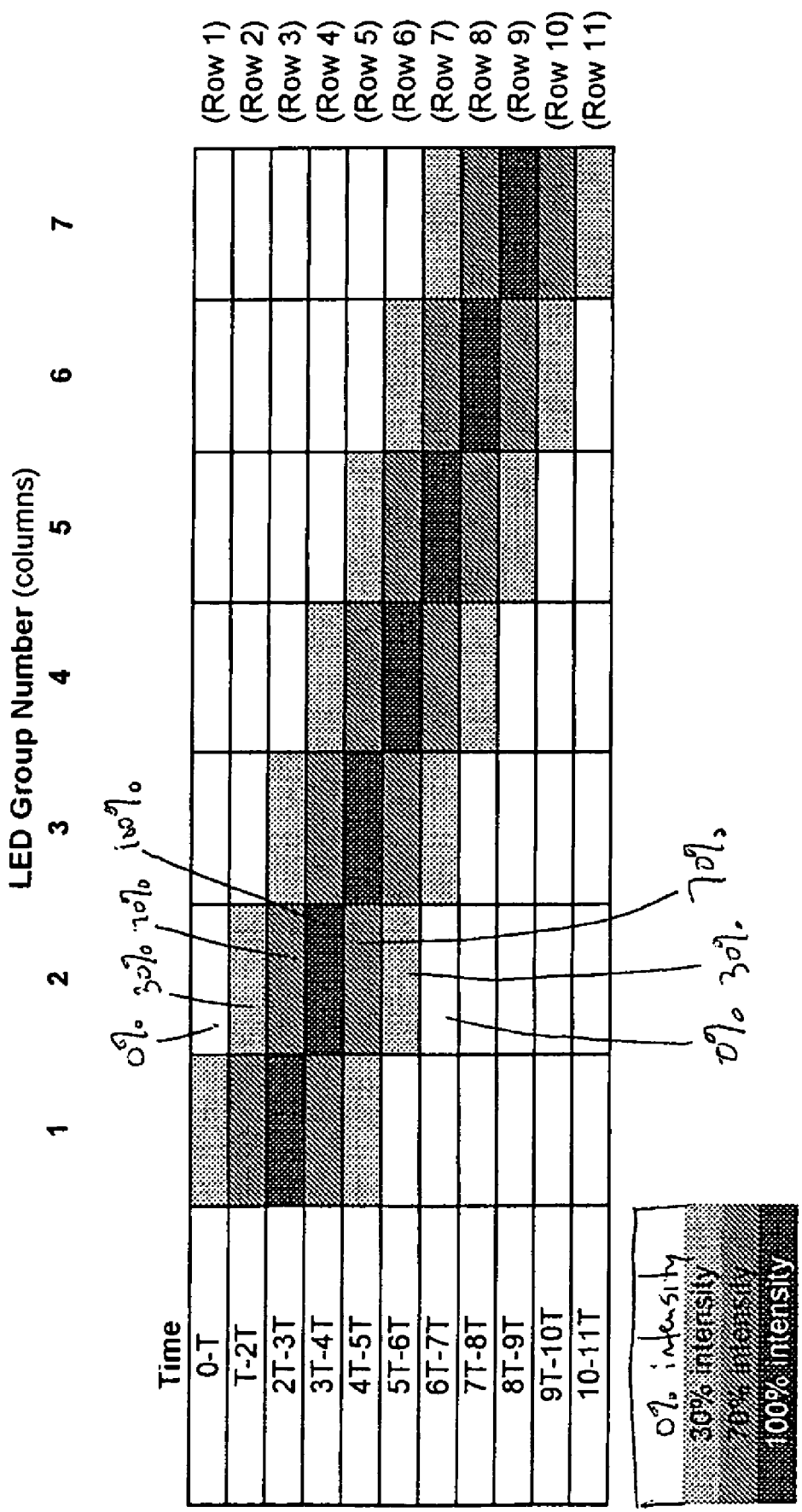
FIG. 4A is a timing diagram of an embodiment of the present invention, depicting 7 LED groups, sequencing through an activation sequence, with 6 states, each state having a predetermined duration of time T.

Referring generally to the timing diagram of FIG. 4A, each group of LEDs begins in an off-state. Then, 1) At time 0, when a demand is input or a switch is activated, or some other method is used to signal the controller 50 to initiate a sequence for the LEDs in the end cap, the first group of LEDs (column 1) is illuminated at a first intensity level—a fraction of its duty cycle—for a predetermined time T (row 1).

2) After predetermined time T (row 2), the light intensity of the first group of LEDs (column 1) is increased to a second intensity level-still less than its full duty cycle. Also, at time T, the light intensity of the second group of LEDs (column 2) is illuminated from an off-state to the first intensity level.

3) After time 2T (row 3), the first group of LEDs (column 1) is illuminated at a third intensity level—approximately 100% of its duty cycle. The light intensity of the second group of LEDs (column 2) is increased to the second intensity level, and the light intensity of the third group of LEDs (column 3) is increased from an off-state to the first intensity level.

4) After time 3T (row 4), the intensity of the first group of LEDs (column 1) is reduced to the second intensity level. The light intensity of the second group of LEDs (column 2) is increased to the third intensity level, the light intensity of the third group of LEDs (column 3) is increased to the second intensity level, and the light intensity of the fourth group of LEDs (column 4) is increased from an off-state to the first intensity level.

5) After time 4T (row 5), the intensity of the first group of LEDs (column 1) is reduced to the first intensity level. The light intensity of the second group of LEDs (column 2) is reduced to the second intensity level, the light intensity of the third group of LEDs (column 3) is increased to the third intensity level, the light intensity of the fourth group of LEDs (column 4) is increased to the second intensity level, and the light intensity of the fifth group of LEDs (column 5) is increased from an off-state to the first intensity level.

6) After time 5T (row 6), the intensity of the first group of LEDs (column 1) is reduced to an off-state. The light intensity of the second group of LEDs (column 2) is reduced to the first intensity level, the light intensity of the third group of LEDs (column 3) is reduced to the second intensity level, the light intensity of the fourth group of LEDs (column 4) is increased to the third intensity level, the light intensity of the fifth group of LEDs (column 5) is increased to the second intensity level, and the light intensity of the sixth group of LEDs (column 6) is increased from an off-state to the first intensity level.

As can be seen in FIG. 4A, the above-described sequencing pattern continues until all groups of LEDs cycle from an off-state through six states: 1) state 1=the first intensity level, 2) state 2=the second intensity level, 3) state 3=the third intensity level, 4) state 4=the second intensity level, 5) state 5=the first intensity level, and 6) state 6=the off-level.

Although the above-described pattern refers to groups of LEDs, it should be recognized that there may only be a single LED in a group.

Figure 4B:
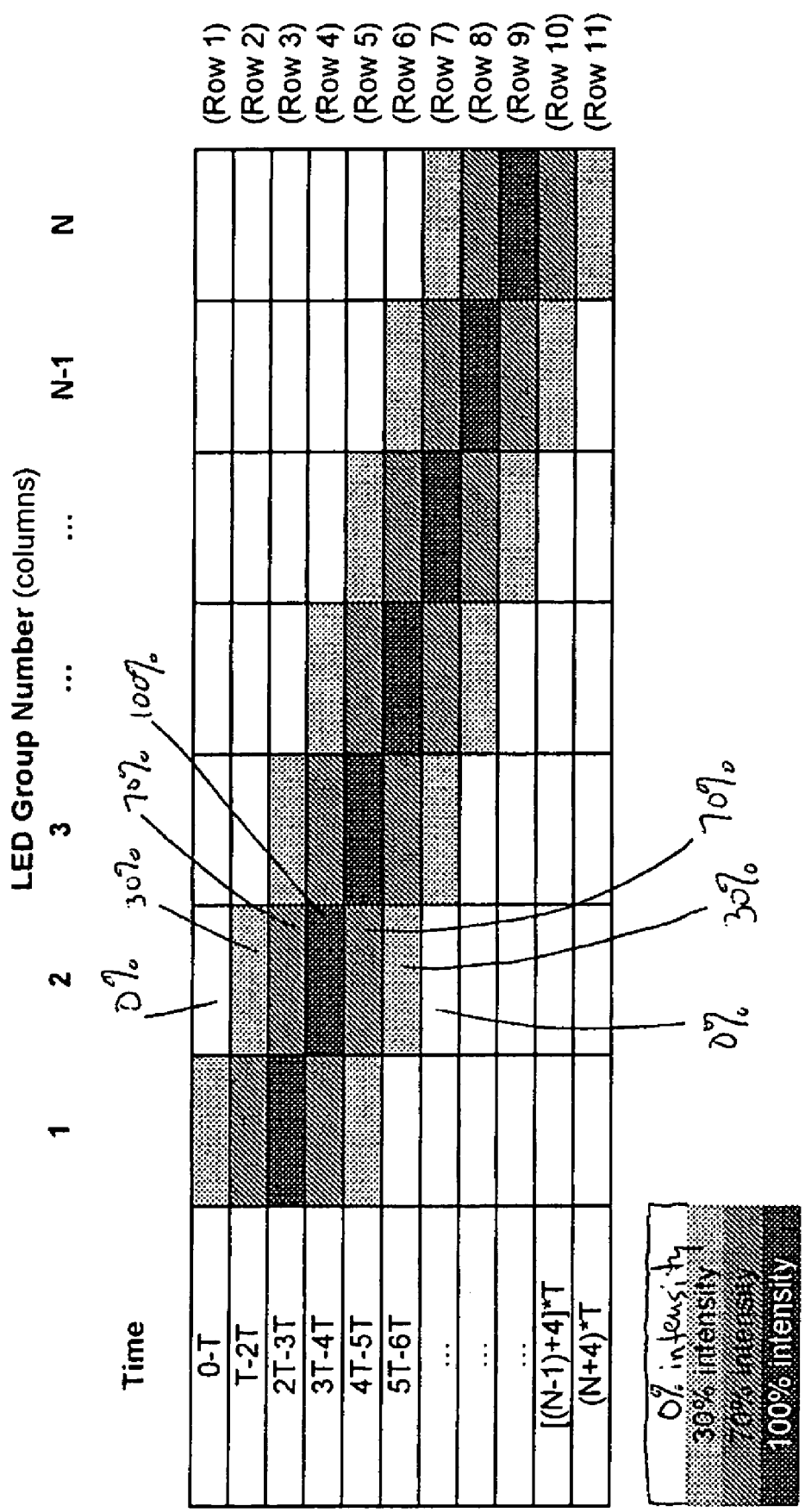
FIG. 4B is a timing diagram of an embodiment of the present invention, depicting a number N LED groups, sequencing through an activation sequence, with 6 states, each state having a predetermined duration of time T.

FIG. 4B depicts the timing diagram of FIG. 4A, but with a number N groups of LEDs.

It should be noted that a preferred embodiment includes the repetition of the above-described sequencing pattern. Another preferred embodiment requires that for each group of LEDs that is illuminated in the above-described sequencing pattern, all the lights in the group are activated substantially simultaneously. That is, all the LEDs in the group transition sequentially from states 1 through 6 together. It should further be noted that there may be more than 6 states, resulting in an increased number of intensity levels.

In another preferred embodiment, the first intensity level is approximately a 30% duty cycle, the second intensity level is approximately a 70% duty cycle, the third intensity level is approximately a 100% duty cycle, and the off-level is approximately a 0% duty cycle (the LEDs not being illuminated).

Another preferred embodiment of the present invention includes having a predetermined time T equal to approximately 76 milliseconds. It should be noted that predetermined time T may be increased or decreased, depending on the desired rotational characteristics. For instance, predetermined time T could be in the range of 1 millisecond to 75 milliseconds if the appearance of a faster rotational speed is desired. Or, predetermined time T could be in the range of 77 milliseconds to 500 milliseconds (or greater) if the appearance of a slower rotational speed is desired. Furthermore, it may also be desirable for T to not be the same for each state. For instance, it may be desirable for an intensity level with approximately a 100% duty cycle to remain on for a time T that is longer, or shorter, than the other intensity levels.

In a preferred embodiment, there are fourteen LEDs (M=14) in an end cap arranged in seven groups (N=7) of two LEDs. In another preferred embodiment, there are fourteen LEDs arranged in fourteen groups of one LED. In another embodiment, the light emitting diode group N each contains an equal number of LEDs 1234.

It may also be desirable to provide a pattern that does not rotate, but instead sequences from LED groups 1 to N, then from groups N to 1, in a repeating pattern.

Although the LEDs 1234 may take on many colors, preferred colors include, but are not limited to red, amber, green, blue, and white. The LEDs may all take on a single color, such as blue, or the LEDs may take on combination of colors.

The controller 50 may also illuminate the LEDs 1234 to provide a unique alternating, oscillating, pulsating, flashing, and/or combination variable rotational, alternating, pulsating, oscillating, or flashing visual warning light effects. A pulsating warning light signal may therefore be provided through the use of modulated light intensity to create a varying visual illumination or intensity effect.

Each individual LED 1234 preferably provides an energy light output of between 20 and 200 or more lumens.

The controller 50 may also provide for the random generation of light signals without the use of a preset pattern of variable light intensity. Controller 50 may also provide a means for activating the LEDs 1234 individually to allow for greater flexibility in the type of warning light signal created.

Light emitting diodes may be manufactured to emit light at any wavelength from infrared to visible. Therefore, an infinite variety of colors of different wavelengths of LEDs 1234 are available. LEDs also are extremely flexible in the provision of an instantaneous light signal which minimizes and/or eliminates carry over illumination after termination of power. For example, the application of power to a traditional light source frequently causes electrons to pass through a filament which in turn causes the temperature of the filament to increase emitting the visible light. The termination of power to a traditional light source having a filament does not immediately terminate the provision of light. A carry over illumination effect continues as the traditional light source filament cools. The traditional light source filament therefore is not flexible for receipt of a rapid pulsed power for transmission of a pulsed light signal.

An LED light source however is well adapted to receive a rapid pulsed power supply for the provision of a pulsed light signal. In fact, LEDs have the capability to pulse thousands of times per second where the rapid pulses are unobservable to an unaided human eye. In these instances, the pulsed LED light source will appear to an individual to be a constant light signal where the pulses are not recognizable.

The duty cycle provided to an LED light source is regulated by a controller 50 which includes a rapid switch to enable the rapid pulsation of the LED light sources, which in turn causes the provision of a pulsating light. Simultaneously, the controller 50 may also regulate an observable light signal for illumination in minutes, seconds, and/or fractions of seconds to provide a desired type of unique light effect.

The power source for the end cap warning signal assembly 1148 may be a low voltage, low current power supply and may include a rechargeable battery capable of receiving recharge through coupling to a solar energy cell. Other sources of electrical power may be suitable substitutes herein.

With respect to selecting the activation sequence, a preferred embodiment may include a pressure switch or a rocker switch. Generally every time the rear position of the rocker switch is depressed, the switch will toggle through a different signal or flash pattern as integral to the controller 50. Upon the selection of a desired signal and/or flash pattern as available for the controller 50, the switch is rocked forward which will initiate the illumination of the selected signal until such time as a replacement signal is engaged. The toggle of the rocker switch to the rear position selects the default light signal or light signal pattern which is illuminated when the switch is manipulated into the operational or forward position for execution.

In general, the controller 50 maintains the selected light signal and/or light signal pattern as the default signal upon actuation of the rocker switch from the forward position to the central off position and the reactivation of the rocker switch forward to the operational position. In this manner, the controller includes a memory to avoid the necessity for an individual to re-toggle through all previous available light or signal patterns to reinitiate illumination of a desired signal. The light signal/pattern to be illuminated by the controller 50 generally is only changed through the toggle function of the rearward position of the rocker switch.

In general, the controller 50 includes a reprogrammable feature where light signals/patterns may be erased/eliminated and replaced with the identical and/or new light signals and/or patterns of light signals. In this instance a remote processing unit may be required to be coupled to the controller 50 via a port connector to effectuate downloading of light signals and/or patterns of light signals for the reprogramming of controller 50.

In general, it is contemplated that the controller 50 will include light signals and/or patterns of light signals which are directed to providing the appearance of a rotational light signal. However, the controller may hold between 15 and 20 different light signals and/or patterns of light signals, for selection through the use of the rocker switch. In an alternative embodiment, controller 50 may include as few as four or five signals and/or patterns of signals as approved by SAE for compliance with industry standards.

Referring to FIG. 5, an end cap warning signal assembly ("end cap") 1148 is depicted, in conjunction with a warning signal light bar 1110. In general, warning signal light bar 1110 is formed of a centralized section 1272 including the leading edge and trailing edge 1142 and 1144 having LED light head assemblies 1138. Two end cap assemblies 1148 are generally provided, where one end cap assembly 1148 is engaged to each end of warning signal light bar 1110. Although not shown depicted, the warning signal light bar 1110 may further include take-down lights. Take-down lights have significant illumination characteristics and can prohibit an individual located in a temporarily stopped vehicle from observing the location or actions or law enforcement personnel within or adjacent to a law enforcement vehicle. The controller 50 can be designed to provide independent control of or between the N groups of LEDs and the take-down lights.

The warning signal light bar 1110 is formed of a central section 1272 and an end cap assembly 1148 attached to each end of central section 1272. Central section 1272 includes a cover 1284 and an extruded base channel 1274 into which a plurality of LED light head assemblies 1138 are releasably secured.

An isometric detail view of the quadrant end cap assemblies 1280 is depicted in FIG. 6. FIG. 6 shows trailing quadrant end cap assembly 1280. One quadrant end cap assembly 1280 is adapted for engagement to leading edge 1142 of warning signal light bar 1110 and the second quadrant end cap assembly 1280 is adapted for engagement to the trailing edge 1144. A halogen light assembly 1282 may be positioned between and proximate to the two quadrant end cap assemblies 1280. A halogen light assembly 1282 includes a halogen light source 1150 used as an alley light.

Figure 7:
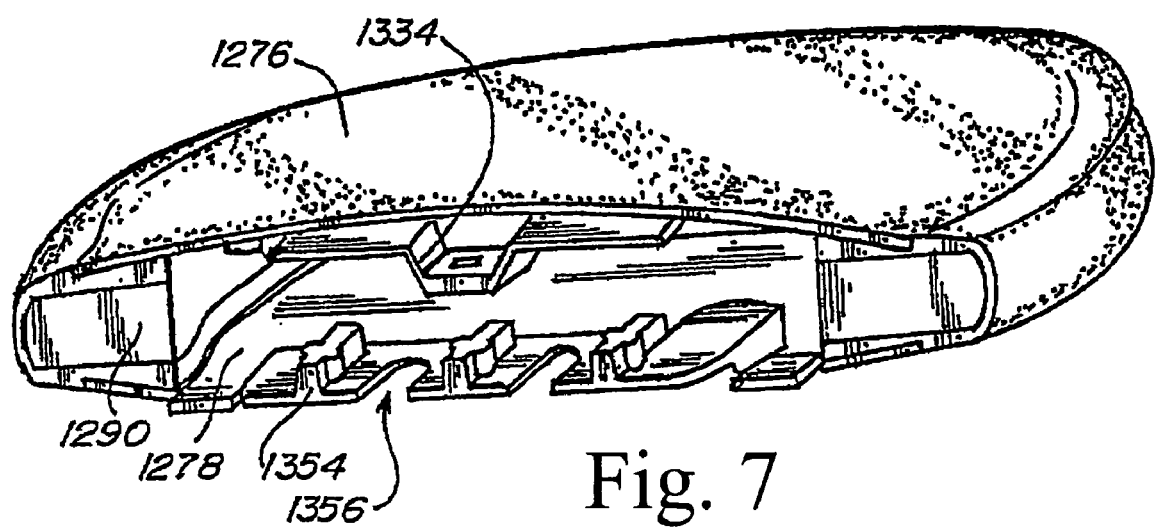
FIG. 7 is a detail isometric rear view of an end cap warning signal assembly.

Each end cap assembly 1148 is formed of an upper housing 1276 and a lower housing 1278, shown in FIG. 7. Preferably two quadrant end cap assemblies 1280 are engaged to the exterior perimeter of the upper and lower end cap housings 1276 and 1278 respectively, shown in FIG. 7. The end cap assembly 1148 further includes a heat sink frame 1288, as shown in FIG. 8. Referring to both FIGS. 8 and 9, the heat sink frame 1288 includes first end 1290 which preferably is positioned proximate and interior to first end 1292 of outer lens 1286. And, second end 1294 of heat sink frame 1288 is also positioned proximate and interior to second end 1296 of outer lens 1286.

Heat sink frame 1288 preferably includes a pair of rearwardly extending fastener posts 1298 which are adapted to engage upper and lower housings 1276, 1278, respectively of end cap assembly 1148. Heat sink frame 1288 may also include a plurality of heat transfer support ribs 1300 which assist in the dissipation of heat generated during illumination of LEDs 1234 as engaged to quadrant end cap assembly 1280.

Referring to FIGS. 6, 8, and 9, each quadrant end cap assembly 1280 provides illumination for an approximate arc of 90° relative to the front or rear of a respective end of the warning signal light bar 1110. Each quadrant end cap assembly 1280 is formed of an outer lens 1286 and a heat sink frame 1288.

Outer lens 1286 is preferably formed of clear and/or substantially clear polycarbonate material permitting light passage therethrough.

Referring to FIG. 8, heat sink frame 1288 includes a plurality of LED pockets 1302. As seen in both FIG. 8 and FIG. 18, the LED pockets 1302, and thus the LEDs themselves, are arranged about the periphery of the end cap assembly 1148.

Each LED pocket 1302 generally includes a pair of opposite side walls 1304. Each opposite side wall 1304 includes a first slot 1306 and a second slot 1308. Each first slot 1306 is preferably aligned between a pair of opposite side walls 1304 and is positioned to the rear of the LED pocket 1302. Each second slot 1308 is preferably aligned between a pair of opposite side walls 1304 and is positioned to the front of LED pocket 1302. Heat sink frame 1288 includes rear wall 1310 which preferably includes a plurality of electrical conductive apertures 1312 therethrough. Each of the electrical conductor apertures 1312 may be positioned proximate to a respective LED pocket 1302 to facilitate electrical connection of controller 50 and power supply to LEDs 1234 as positioned within LED pockets 1302.

Figure 10:
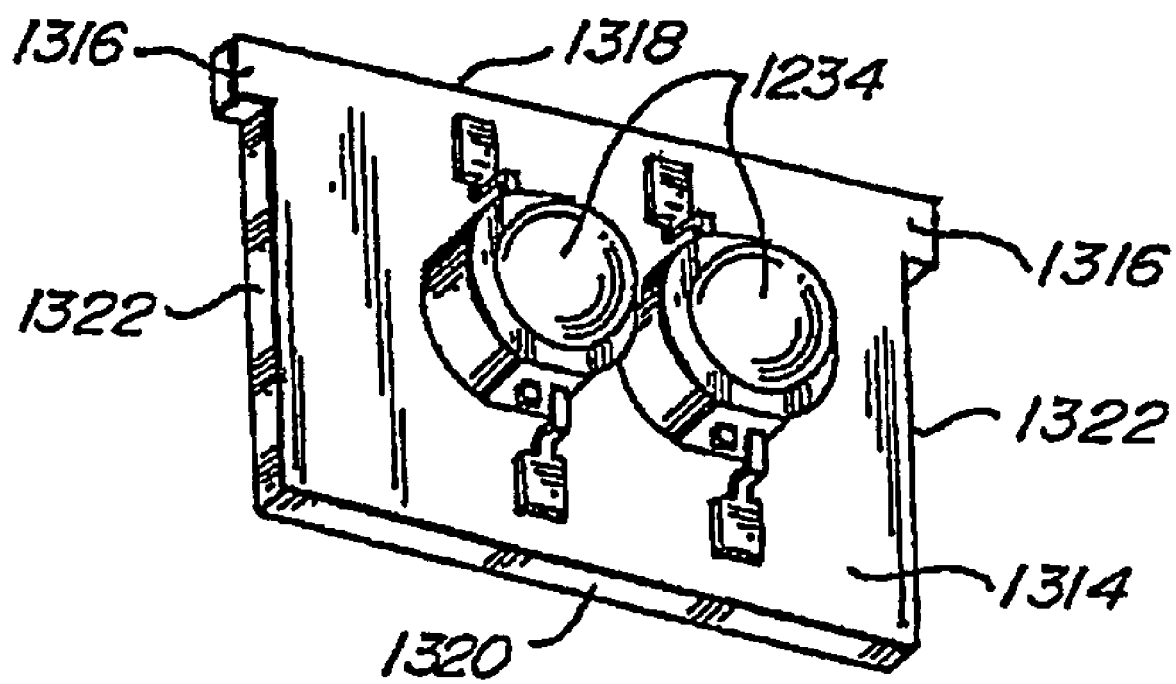
FIG. 10 is a detail isometric view of an alternative LED light source.

Referring to FIG. 10, an LED pocket printed circuit board 1314 is shown. LED pocket printed circuit board 1314 includes a pair of LEDs 1234, a pair of positioning tabs 1316, a top edge 1318, a bottom edge 1320, and a pair of opposite side edges 1322.

The LED pocket printed circuit board 1314 is constructed and arranged to be vertically positioned within the aligned first slots 1306 of the opposite side walls 1304, with the LEDs 1234 facing outwardly. An electrical conductor preferably is electrically connected to the LED pocket printed circuit board 1314 for passing through rear wall 1310 and for electrical connection to controller 50. Each pair of side edges 1322 of LED pocket printed circuit board 1314 is preferably in flush engagement to a respective first slot 1306. The positioning tabs 1316 preferably prevent the LED pocket printed circuit board 1314 from being inserted within first slot 1306 to an undesirable depth.

Referring to FIGS. 11, 12, 13, and 14, the light pipes 1252 are shown in additional detail. Generally, the light pipes 1252 are formed of acrylic plastic material which acts as a magnifier for the optical light. An individual light pipe 1252 is generally positioned proximate to a group of two or three LED light sources 1234. Each individual light pipe 1252 functions to culminate light as emitted from LED light sources 1234 into a desired area or line of transmission. Each individual light pipe 1252 acts as an optical lens. Alternatively, each light pipe 1252 may be formed of reflective material to maximize illumination of LED light sources 1234 as viewed by individuals. Each individual light pipe 1252 precisely positions an LED light source 1234 within LED light head assembly 1138 and/or end cap assembly 1148. A light pipe 1252 may be increased or decreased in size for use with any desired number of LED light sources 1234.

The optical lens 1254 is generally tub shaped and includes a forward face 1256 having flange 1258 which extends outwardly from the inner section between the tub shaped optical lens 1254 and the forward face 1256. A pair of positioning posts 1260 extend rearwardly from the optical lens 1254. Each positioning post 1260 preferably includes a penetrating section 1262 designed for insertion into aperture 1264 in LED circuit board 1232. The apertures 1264 are preferably aligned with first apertures 1236 of housing 1228.

Figure 11:
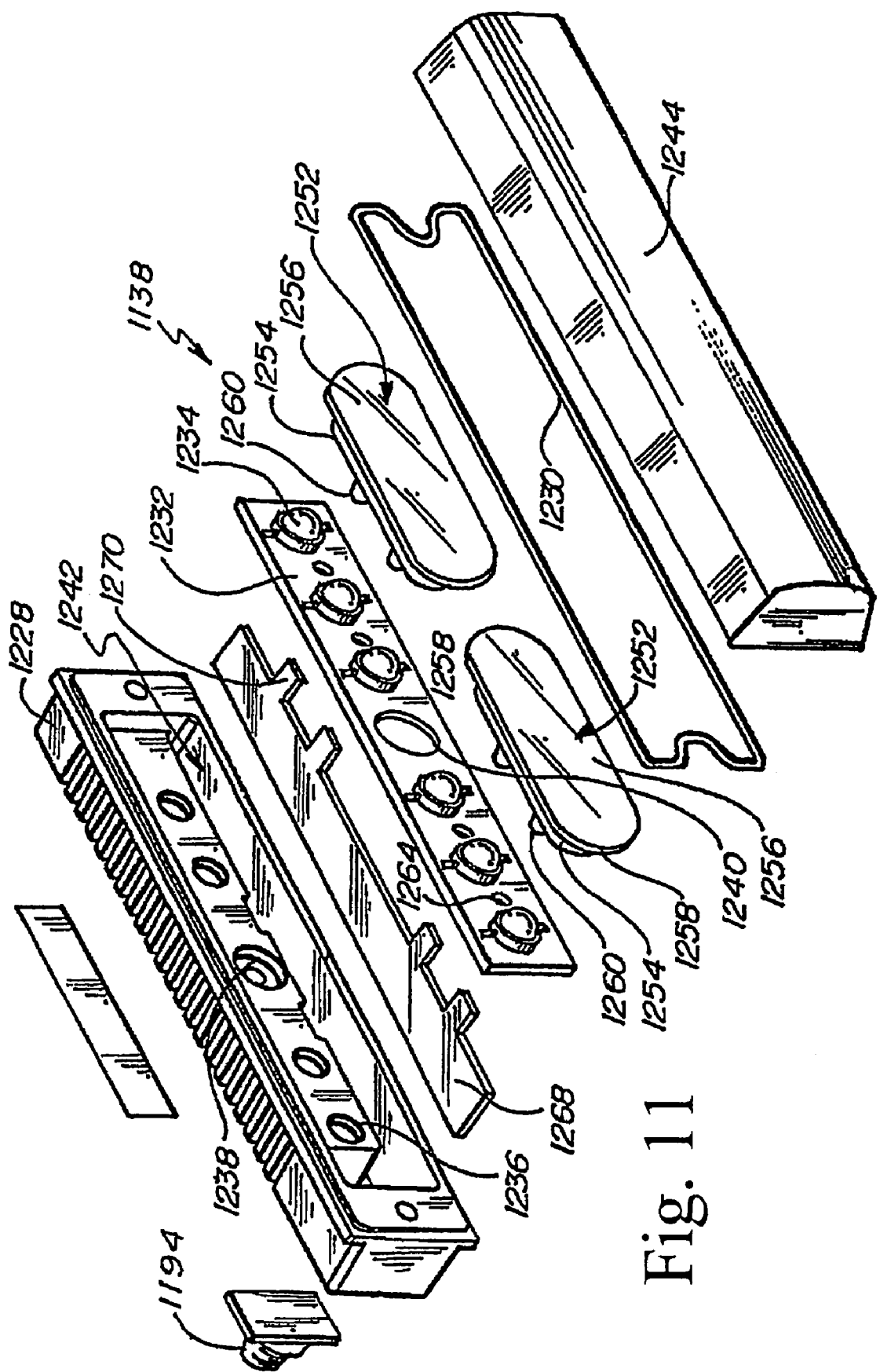
FIG. 11 is an exploded isometric view of an LED module light source assembly used within the alternative embodiment for the end cap warning signal assembly.
Figure 12:
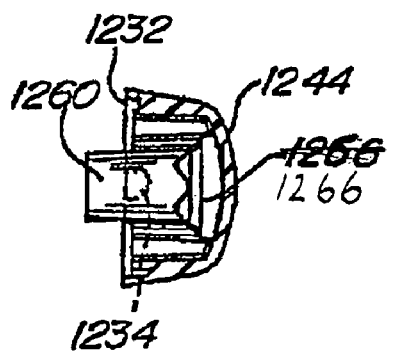
FIG. 12 is a detail cross sectional side view of the LED module light source assembly.
Figure 13:
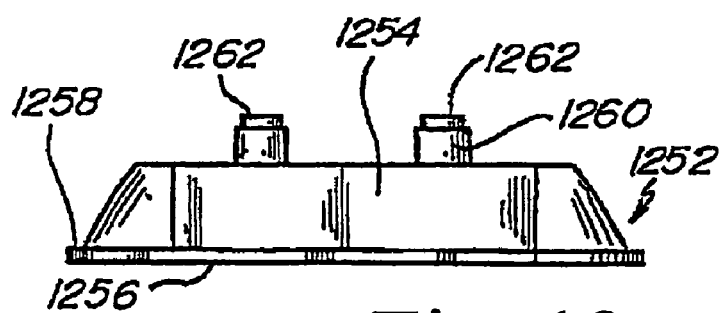
FIG. 13 is a detail top view of a light pipe for an LED module light source assembly.
Figure 14:
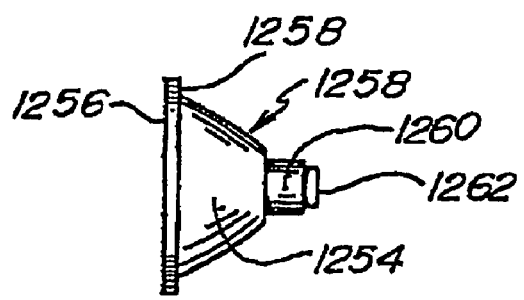
FIG. 14 is a detail end view of a light pipe for an LED module light source assembly.

As may be seen in FIG. 11, at least one LED light source 1234 is positioned between two positioning posts 1260. In addition, an individual LED light source 1234 may also be positioned to the exterior of each respective positioning post 1260. The rear of the optical lens 1254 preferably includes at least one and/or a plurality of LED receiving depressions 1266, each of which is adapted to receive an individual LED light source 1234. The domes of the individual LED light sources 1234 partially penetrate into the LED receiving depressions 1266 for traverse of the rear of the optical lens 1254 and positioning with the interior of the optical lens 1254.

During use, the optical lens 1254 captures substantially all of the light energy emitted from the LEDs 1234 and efficiently redirects the light energy outwardly and forwardly through the culminated parallel horizontal light spreaders 1246 (FIG. 9) of the housing cover 1244 or outer lens 1286. The flange 1258 of the optical lens 1254 preferably is adapted for engagement and positioning proximate to the optical references of the interior of the housing cover 1244. Exact positioning of the optical lens 1254 relative to the horizontal light spreaders 1246 and housing cover 1244 is thereby obtained.

Referring to FIG. 11, support 1268 is preferably a horizontal circuit board as positioned within bottom slot 1242. Support horizontal circuit board 1268 is in electrical communication to vertical LED circuit board 1232 through the electrical connection of four tabs 1270 forming the electrical connection between the electrical fixture 1194 and the support horizontal circuit board 1268, and the vertical LED circuit board 1232 and finally to the LED light sources 1234.

Figure 15:
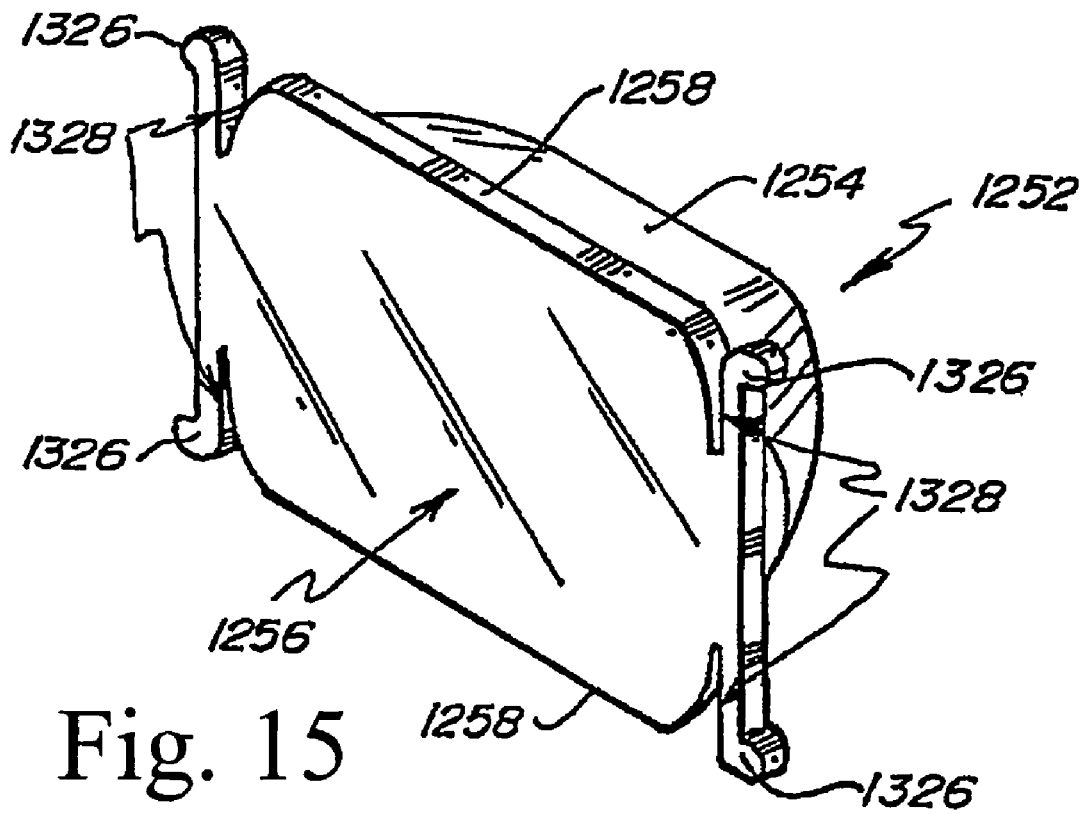
FIG. 15 is a detail isometric view of an LED light pipe for an embodiment of the end cap warning signal assembly.
Figure 16:
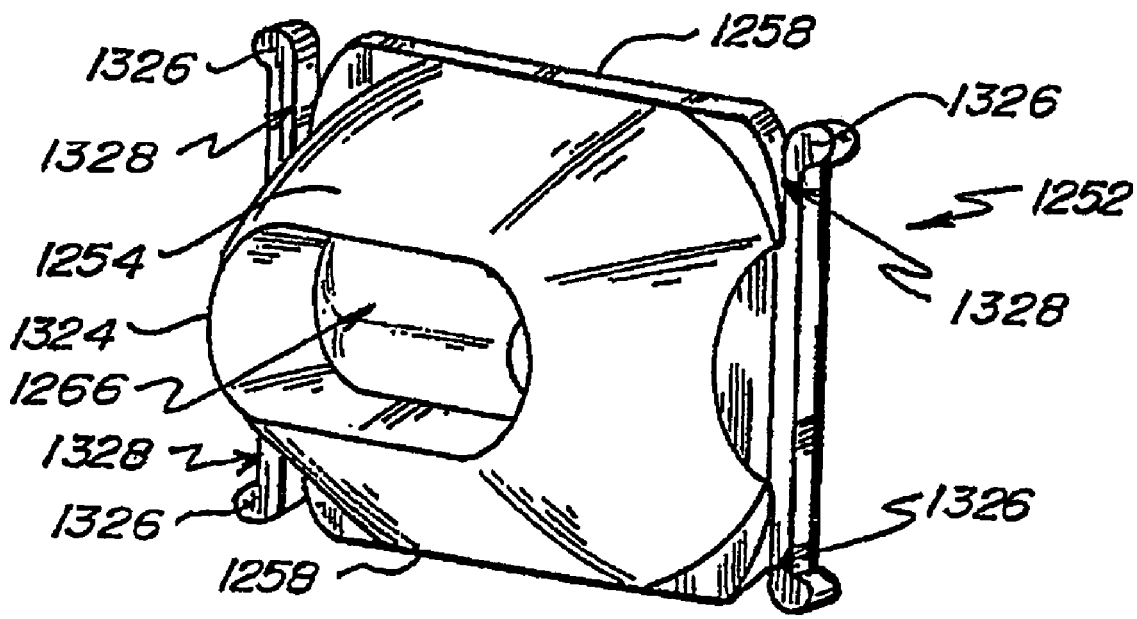
FIG. 16 is a detail reverse isometric view of an LED light pipe embodiment for an end cap warning signal assembly.

FIGS. 15 and 16 depict an alternative embodiment of a light pipe 1252 including optical lens 1254. Light pipe 1252 generally includes forward face 1256 and LED receiving depression 1266. LED receiving depression 1266 preferably receives LEDs 1234 when LED pocket printed circuit board 1314 is positioned proximate to protruding edge 1324 of rearward extending optical lens 1254. The top and bottom of light pipe 1252 include flange 1258. On each side of light pipe 1252 are preferably located a pair of spring tabs 1326. Spring tabs 1326 may be integral to sides of forward face 1256 of light pipe 1252. Each spring tab 1326 is preferably at the distal end of a spring support 1328 which is used to provide outward pressure to releasably secure spring tabs 1326 within second slots 1308 of the opposite side walls 1304 of the LED pockets 1302. As may be seen in FIG. 8, light pipes 1252 are positioned within LED pockets 1302 for outward transmission of light through forward faces 1256.

It is anticipated that alternative types of engagement/positioning members may be substituted for spring tabs 1326 to position light pipe 1252 within second slots 1308 of LED pockets 1302. It is anticipated that any number of types of springs, tabs, positioning limiters and/or other affixation devices may be used herein.

As may be seen in FIG. 8, the heat sink frame 1288 preferably includes seven LED pockets 1302 for transmission of LED light outwardly from quadrant end cap assembly 1280 at an approximate arc of 90°. Heat sink frame 1288 may be suitably adapted to support any desired number of LED pockets 1302. The light pipes 1252 culminate the transmitted LED light into a desired angle which then passes through the forward face 1256 for transmission to the rear of back of the outer lens 1286 of the quadrant end cap assembly 1280.

The interior of the outer lens 1286 preferably includes a plurality of horizontal and/or vertical light spreaders 1246. The outer lens 1286 is positioned over and engaged to the heat sink frame 1288 to enclose and protect the LED pockets 1302 and LEDs 1234 from the environment. The interior of the outer lens 1286 additionally may include one or more photo detectors 1332 which may function as a sensor for day/night conditions. The photo detector 1332 may be in communication with a controller 50 to assist in the provision of a desired brightness of light signal, pattern, combination, or sequence of light signals as identified herein.

Figure 17:
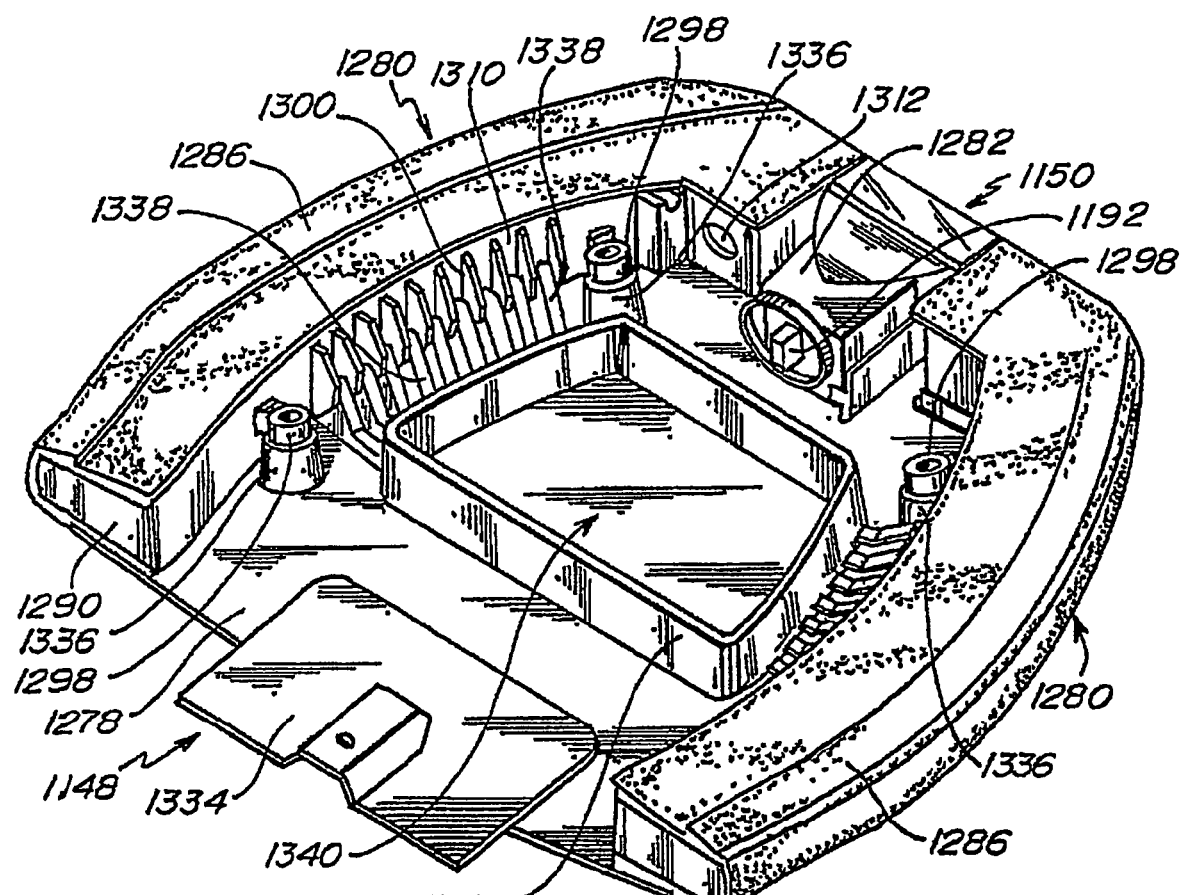
FIG. 17 is a detail isometric bottom view of an end cap warning signal assembly.
Figure 18:
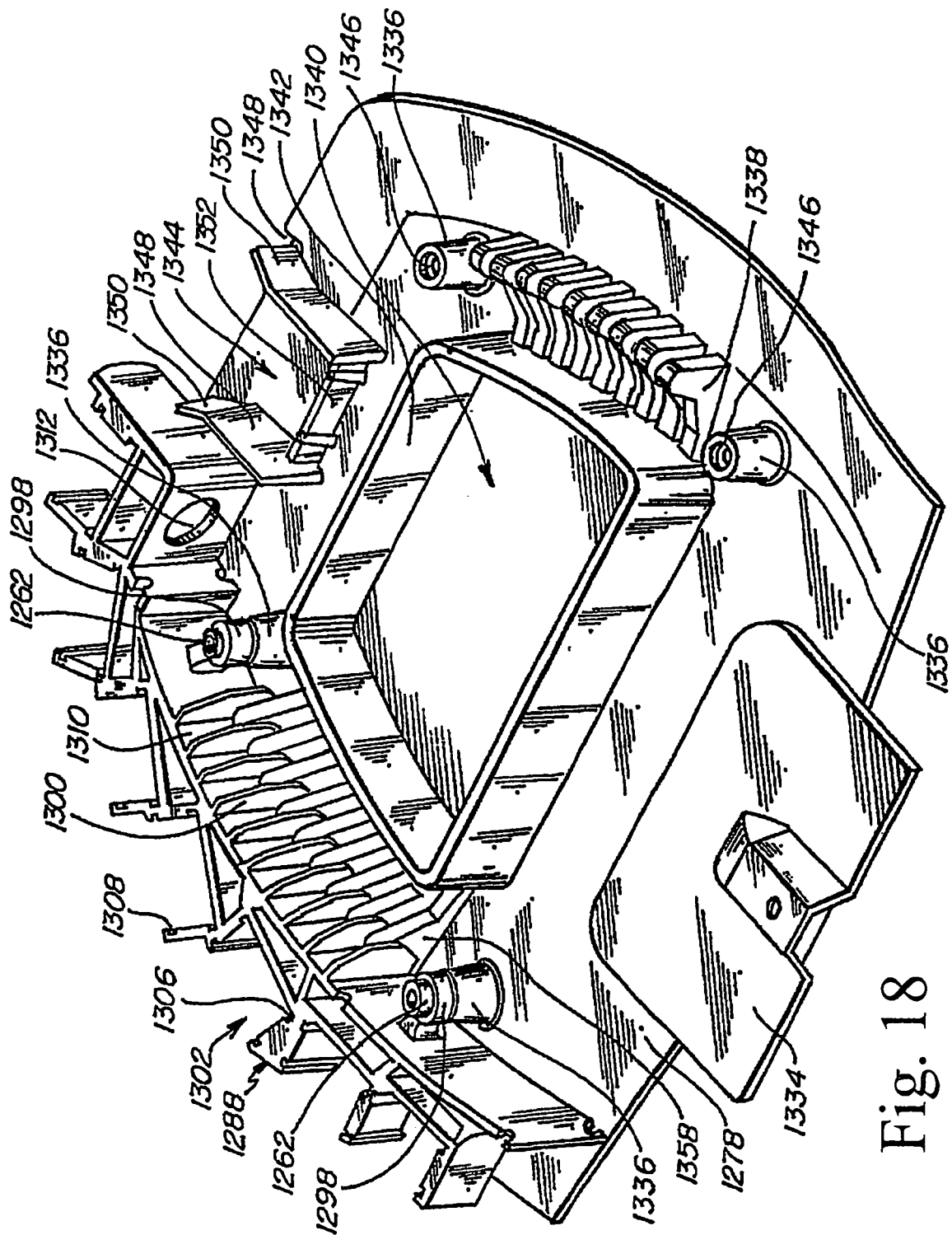
FIG. 18 is an alternative detail isometric bottom interior view of a base of an end cap warning signal assembly.

Referring to FIGS. 17 and 18, an underside view of the upper housing 1276 of the end cap assembly 1148 is shown. The end cap assembly 1148 of FIG. 17 includes two engaged quadrant end cap assemblies 1280 as well as a halogen light assembly 1282. The end cap assemblies 1148 include upper housing 1276. Upper housing 1276 includes an affixation bracket 1334, downwardly extending pillars 1336, a plurality of transfer braces 1338, a central pocket 1340 defined by a central pocket wall 1342, and a halogen pocket 1344.

The upper housing 1276 generally supports the quadrant end cap assemblies 1280 and the halogen light assembly 1282. One upper housing 1276 is affixed to each end of central section 1272 through the use of affixation brackets 1334. The affixation brackets 1334 may include a support plate and may be attached to central section 1272 through the use of screws, bolts, welding, adhesives, and/or any other type of affixation mechanism. In order to facilitate maintenance and repair, the upper housing 1276 is preferably releasably engaged to the central section 1272.

The pillars 1336 are preferably constructed to engage the fastener posts 1298 to support and fixedly position the heat sink frame 1288 and a quadrant end cap assembly 1280 relative to the upper housing 1276. The pillars 1336 preferably include a central opening 1346 which is sized to receivingly engage a penetrating section 1262 of the fastener posts 1298. Heat sink frame 1288 and outer lens 1286 are thereby attached to upper housing 1276.

Upper housing 1276 additionally includes a plurality of downwardly extending and regularly spaced heat transfer braces 1338. The heat transfer braces 1338 are generally positioned between adjacent heat transfer support ribs 1300 of the heat sink frame 1288. The heat transfer braces 1338 are preferably regularly spaced and are further positioned proximate to the sides of the central pocket wall 1342. (FIGS. 17 and 18.)

The heat transfer braces 1338 further assist in the positioning of the heat sink frame 1288 and the quadrant end cap assembly 1280 relative to the lower housing 1278.

The central pocket wall 1342 defines the central pocket 1340. The central pocket 1340 is the area of the upper housing 1276 into which a printed circuit board (PCB) is placed for communication and control of the light sources integral to the end cap assemblies 1148. The PCB internal to the central pocket 1340 may include a first controller, the first controller controlling the illumination of LED light sources 1234 and/or halogen light sources 1150, for the provision of any of the type of light signal and combinations, patterns, or sequences of light signals described with respect to any embodiment herein. Or, there may be a second controller 50, external the central pocket 1340, for example mounted within the warning signal light bar 1110, for the provision of any of the types of light signal and combinations, patterns, or sequences of light signals described with respect to any embodiment herein. Further, there may be a second controller 50, external to the central pocket 1340, for example mounted within the warning signal light bar 1110, which is operatively connected with a first controller 50 internal to the central pocket 1340 for the provision of any of the type of light signal and combinations or sequences of light signals described with respect to any embodiment herein. By employing a second controller in addition to the first controller, redundancy is achieved, thereby allowing control of the LEDs in the end cap, despite a failure of first controller.

The halogen pocket 1344 receives a halogen light assembly 1282. Halogen pocket 1344 includes a pair of positioning side walls 1348. Each positioning side wall 1348 may include an offset guide 1350. Each halogen pocket 1344 additionally includes a rear wall 1352. Rear wall 1352 functions as a stop to restrict the penetration of halogen light assembly 1282 during insertion into a respective halogen pocket 1344.

Each halogen light assembly 1282 includes a halogen light source 1150 formed of a 55 watt halogen lamp. The halogen light source 1150 as engaged to the end cap assemblies 1148 function as an alley light illuminating areas outwardly from the sides of a vehicle and from the warning signal light bar 1110. It may be desirable to include at least one LED 1234, along with the halogen light source 1150. Or, it may be desirable to use only LEDs 1234, instead of a halogen light source 1150.

Lower housing 1278 generally includes second affixation bracket 1354 including a plurality of receiving slots 1356. Lower housing 1278 may further include pillars 1336, transfer braces 1338, central pocket 1340, central pocket wall 1342, and halogen pocket 1344 as described in reference to the upper housing 1276. Generally, the features of the pillars 1136, transfer braces 1338, central pocket 1340, central pocket wall 1342, and halogen 1344, are identical between upper and lower housings 1276, 1278. The receiving slots 1356 of the lower bracket 1354 are generally adequate to receive positioners which may be pins or bolts as integral to each end of central section 1272 of warning signal light bar 1110. The end cap assemblies 1148 are designed to be releasably secured to each end of central section 1272 to facilitate ease of maintenance, repair, and/or replacement during use of the warning signal light bar 1110.

In addition to being directed to the embodiments described above and claimed below, the present invention is further directed to embodiments having different combinations of the features described above and claimed below. As such, the invention is also directed to other embodiments having any other possible combination of the dependent features claimed below.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof, and it is, therefore, desired that the present embodiment be considered in all respects as illustrative and not restrictive, reference being made to the appended claims rather than to the foregoing description to indicate the scope of the invention.

What is claimed is:

1. An end cap warning signal assembly comprising:
   an end cap, the end cap having a periphery, the end cap comprising a plurality of M light emitting diodes, M being an integer of at least one, at least one light emitting diode being engaged to each of the front, the first side, and the second side, the M light emitting diodes receiving power from a power source, the M light emitting diodes arranged in N light emitting diode groups, N being an integer of at least one light emitting diode groups 1, 2, 3, . . . , N arranged sequentially about the periphery; and
   a first controller operatively connected with the N groups of light emitting diodes, the first controller programmed to activate the N groups of light emitting diodes, whereby:
     each light emitting diode has at least 6 states, the first state having a first intensity level, the second state having a second intensity level, the third state having a third intensity level, the fourth state having the second intensity level, the fifth state having the first intensity level, and the sixth state having an off level, each of the 6 states having a predetermined duration of time T;

for light emitting diode groups 1 to N the light emitting diodes of each Nth light emitting diode group beginning at an off level, the light emitting diodes of each Nth light emitting diode group proceeding from the off level to the first state through the sixth state, each light emitting diode group 1 to N being activated sequentially in an activation sequence, each Nth light emitting diode group activating its first state at T seconds after the (N−1)th light emitting diode group activated its first state.

2. The end cap warning signal assembly according to claim 1, wherein the activation sequence of claim 1 is repeated in order to simulate a rotating warning light signal.

3. The end cap warning signal assembly according to claim 1, wherein the light emitting diodes of each Nth light emitting diode group are activated substantially simultaneously.

4. The end cap warning signal assembly according to claim 1, the first intensity level comprising approximately a 30% duty cycle, the second intensity level comprising approximately a 70% duty cycle, and the third intensity level comprising approximately a 100% duty cycle.

5. The end cap warning signal assembly according to claim 1, the predetermined duration of time T comprising approximately 76 milliseconds.

6. The end cap warning signal assembly according to claim 1, wherein each light emitting diode group N has an equal number of light emitting diodes.

7. The end cap warning signal assembly according to claim 1, wherein M=14 and N=7.

8. The end cap warning signal assembly according to claim 1, wherein the first controller is placed within the end cap.

9. The end cap warning signal assembly according to claim 8, further comprising a second controller, the second controller being placed external to the end cap.

10. The end cap warning signal assembly according to claim 9, wherein the second controller is operatively connected with the first controller, the second controller programmed to activate the first controller which in turn activates the N groups of light emitting diodes in order to simulate a rotating warning light signal.

11. The end cap warning signal assembly according to claim 9, wherein the second controller is operatively connected with the N groups of light emitting diodes, the second controller programmed to activate the N groups of light emitting diodes in order to simulate a rotating warning light signal.

12. The end cap warning signal assembly according to claim 1, wherein M=14 and N=14.

13. The end cap warning signal assembly according to claim 1, wherein each light emitting diode is selected from the group consisting of red, blue, amber, green, and white.

14. The end cap warning signal assembly according to claim 1, further comprising a light bar.

\* \* \* \* \*